(12) United States Patent
Yamawaki et al.

(10) Patent No.: US 11,053,977 B2
(45) Date of Patent: Jul. 6, 2021

(54) SQUEEZE FILM DAMPER AND ROTARY MACHINE

(71) Applicant: MITSUBISHI HEAVY INDUSTRIES, LTD., Tokyo (JP)

(72) Inventors: Teruaki Yamawaki, Tokyo (JP); Yasunori Tokimasa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/589,741

(22) Filed: Oct. 1, 2019

(65) Prior Publication Data

US 2020/0109743 A1    Apr. 9, 2020

(30) Foreign Application Priority Data

Oct. 4, 2018 (JP) .............................. JP2018-188775
Mar. 22, 2019 (JP) .............................. JP2019-055581

(51) Int. Cl.
  *F16C 27/02* (2006.01)
  *F16C 17/03* (2006.01)
(52) U.S. Cl.
  CPC .............. *F16C 27/02* (2013.01); *F16C 17/03* (2013.01)
(58) Field of Classification Search
  CPC .......... F16C 17/02; F16C 17/03; F16C 17/12; F16C 27/02; F16C 27/045
  See application file for complete search history.

(56) References Cited

U.S. PATENT DOCUMENTS

| 3,318,642 | A | * | 5/1967 | Peterson | ................. | F16C 23/04 384/215 |
| 4,289,360 | A | * | 9/1981 | Zirin | ................... | F16F 15/0237 384/462 |
| 4,872,767 | A | * | 10/1989 | Knapp | ................... | F16C 33/586 384/99 |
| 4,992,024 | A | * | 2/1991 | Heydrich | ............... | F01D 25/164 384/99 |
| 2014/0185974 | A1 | | 7/2014 | Schmidt | | |
| 2017/0002863 | A1 | | 1/2017 | Kawashita et al. | | |

FOREIGN PATENT DOCUMENTS

| CN | 102788113 | | 11/2012 |
| CN | 103842668 | | 6/2014 |
| CN | 105793585 | | 7/2016 |
| CN | 108487949 | | 9/2018 |
| JP | 54087342 | * | 7/1979 |
| JP | 2003-83325 | | 3/2003 |

* cited by examiner

*Primary Examiner* — James Pilkington
(74) *Attorney, Agent, or Firm* — Wenderoth, Lind & Ponack, L.L.P.

(57) ABSTRACT

A squeeze film damper includes an inner member configured to support a bearing unit, an outer member provided circumferentially outward from the inner member to face the inner member with a gap extending in an circumferential direction interposed therebetween, a holed member provided in the gap and having a plurality of communication holes configured to allow a first region of the gap on an inward side in a radial direction and a second region of the gap on an outward side in the radial direction to communicate with each other, and an oil supply path configured to supply oil to the first region.

15 Claims, 13 Drawing Sheets

CIRCUMFERENTIAL DIRECTION

SQUEEZE FILM DAMPER AND ROTARY MACHINE

CROSS-REFERENCE TO RELATED APPLICATION

Priority is claimed from Japanese Patent Application No. 2018-188775, filed Oct. 4, 2018, and Japanese Patent Application No. 2019-055581, filed Mar. 22, 2019, the contents of which are incorporated herein by reference.

BACKGROUND OF THE INVENTION

Field of the Invention

The present disclosure relates to a squeeze film damper and a rotary machine.

Description of Related Art

In the related art, a rotary machine including a steam turbine, a gas turbine or a compressor includes a bearing apparatus configured to support a rotor shaft. For example, a journal bearing configured to support at least a lower portion of the rotor shaft using bearing metal from a radial direction may supply oil and form an oil film between the rotor shaft and the bearing metal. As a result, direct metal contact between the rotor shaft and the bearing metal is prevented.

Further, a circular ring (an inner ring) configured to support the rotor shaft via the bearing metal or a bearing pad can be supported via a circular ring (an outer ring) having a larger diameter. Then, a squeeze film damper bearing including a damping function due to a so-called squeeze action when oil is supplied to a gap between the bearing metal or the inner ring and the outer ring and an oil film is formed between an outer circumferential surface of the bearing metal or the inner ring and an inner circumferential surface of the outer ring is known (for example, see Japanese Unexamined Patent Application, First Publication No. 2003-83325, hereinafter "JP 2003-83325").

SUMMARY OF THE INVENTION

Since the squeeze film damper bearing disclosed in JP 2003-83325 prevents oil film shortage, oil is supplied to a gap formed along an inner circumference of the outer ring. However, the damping performance of a damper based only on the squeeze action using such an oil film cannot easily be adjusted except for via selection or adjustment of the viscosity of the oil. Even if the viscosity of the oil is selected or adjusted, it may be difficult to greatly improve the damping performance.

In consideration of the above-mentioned circumstances, improvement in damping performance of a squeeze film damper and a rotary machine is achieved by a simple configuration.

(1) A squeeze film damper according to at least one embodiment of the present disclosure includes an inner member configured to support a bearing unit; an outer member provided circumferentially outward from the inner member to face the inner member with a gap extending in an circumferential direction interposed therebetween; a holed member provided in the gap and having a plurality of communication holes configured to allow a first region of the gap on an inward side in a radial direction and a second region of the gap on an outward side in the radial direction to communicate with each other; and an oil supply path configured to supply oil to the first region.

According to the configuration of the above-mentioned (1), the holed member including the plurality of communication holes configured to allow the first region on the inward side in the radial direction and the second region on the outward side in the radial direction to communicate with each other is disposed in the gap between the inner member and the outer member. As a result, when the bearing unit and the inner member are vibrated, some of the oil passes through the communication holes of the holed member while following the outer circumferential surface of the inner member, and receives a resistance force during passage. That is, in addition to the squeeze effect in the related art, the oil passing through the communication holes of the holed member functions as a damper with respect to the vibrations of the inner member. As a result, damping performance of the squeeze film damper can be greatly improved by a simple configuration.

Further, the damping effect of the holed member can be adjusted by arbitrarily setting, for example, the number, size, arrangement, orientation, shape, or the like, of the communication holes according to vibration characteristics of the rotary machine on which the holed member is mounted.

(2) In some embodiments, in the configuration of the above-mentioned (1), the oil supply path may include an internal flow path configured to introduce the oil to the first region from an axial end portion of the inner member.

According to the configuration of the above-mentioned (2), the oil can be supplied to the first region by supplying the oil to the internal flow path in the inner member from the axial end portion of the inner member. For this reason, for example, there is no need to provide an oil supply route for the oil to pass through the outer member and the holed member in the radial direction. That is, the effect described in the above-mentioned (1) can be exhibited with a simple configuration of supplying the oil to the internal flow path from the axial end portion of the inner member.

(3) In some embodiments, in the configuration of the above-mentioned (2), the internal flow path may include an axial extension section extending from the axial end portion in the axial direction, and a radial extension section continuous with the axial extension section and extending in the radial direction.

According to the configuration of the above-mentioned (3), the oil supplied to the internal flow path from the axial end portion of the inner member is supplied to the first region via the axial extension section and the radial extension section. Accordingly, a degree of design freedom of the internal flow path can be improved.

(4) In some embodiments, in the configuration of the above-mentioned (3), one or a plurality of radial extension sections may be formed per one axial extension section.

According to the configuration of the above-mentioned (4), the oil introduced to the axial extension section is supplied to the first region via the one or the plurality of radial extension sections continuous with the axial extension section and extending in the radial direction. A desired number of radial extension sections are formed to be continuous with the one axial extension section. Accordingly, the oil is supplied to the first region from the one or plurality of appropriate positions in the axial direction to form the oil film at a position in the circumferential direction of the inner member in which the internal flow path is provided.

(5) In some embodiments, in the configuration of the above-mentioned (1), the oil supply path may be formed to pass through the outer member and the holed member in the radial direction and configured to supply the oil to the first region.

According to the configuration of the above-mentioned (5), the oil supplied to the first region is supplied via the oil supply path configured to pass through the outer member and the holed member in the radial direction. In the above-mentioned configuration, the effect described in the above-mentioned (1) can be exhibited by a simple configuration in which a contact area of the oil supply route in the axial direction of the inner member is minimized.

(6) In some embodiments, in the configuration according to any one of the above-mentioned (1) to (5), the holed member may be supported by the outer member at a plurality of places at intervals in the circumferential direction.

According to the configuration of the above-mentioned (6), relative movement between the holed member and the outer member can be restricted by supporting the holed member using the outer member. In addition, for example, the holed member and the outer member can be more strongly fixed in comparison with the case in which the holed member is supported at one place in the circumferential direction by supporting the holed member at a plurality of places at intervals in the circumferential direction. According to the above-mentioned configuration, for example, when the bearing unit and the inner member are vibrated, the inner member relatively approaches and separates from the holed member supported by the outer member. Accordingly, whenever the inner member is vibrated, since the oil can effectively pass through the communication holes of the holed member, the damping effect of the holed member can be more efficiently exhibited.

(7) In some embodiments, in the configuration of any one of the above-mentioned (1) to (6), a dimension D between the inner member and the holed member and a diameter d of the communication holes may satisfy 0.1d<D<10d.

The damping effect of the oil passing through the communication holes may not be obtained properly when the diameter of the communication holes is too large or too small.

In this respect, according to the configuration of the above-mentioned (7), the diameter d of the communication holes with respect to the dimension D of the gap between the inner member and the holed member needs to be within a range of the same order of magnitude. For this reason, the number, size, arrangement, orientation, shape, or the like, of the communication holes are arbitrarily set according to vibration characteristics of the rotary machine on which the holed member is mounted. Accordingly, the communication holes can be adjusted to provide appropriate damping characteristics.

(8) In some embodiments, in the configuration of any one of the above-mentioned (1) to (7), the communication holes may be formed in a tubular shape extending in the radial direction.

According to the configuration of the above-mentioned (8), a shape of the communication holes is a tubular shape extending in the radial direction. Accordingly, the effects described in any one of the above-mentioned (1) to (7) can be exhibited with a simple configuration.

(9) In some embodiments, in the configuration of any one of the above-mentioned (1) to (8), the communication hole disposed closest to an axial end portion in at least the holed member may be inclined from the radial direction such that a central axis thereof comes closer to the axial end portion on an outward side rather than on an inward side in the radial direction.

When the inner member approaches to be inscribed with the outer member having a tubular shape due to vibrations, the oil present in the gap therebetween is also moved in the axial direction in addition to the circumferential direction.

In this respect, according to the configuration of the above-mentioned (9), the central axis of the communication hole is inclined from the radial direction to approach the axial end portion as it goes outward in the radial direction. For this reason, the oil having a velocity component in the axial direction can easily flow into the communication hole due to the oil being extruded toward the axial end portion. Accordingly, the damping effect of the communication holes can be more efficiently exhibited.

(10) In some embodiments, in the configuration according to any one of the above-mentioned (1) to (8), the communication hole may be formed to have a smaller diameter on an outward side than on an inward side in the radial direction.

According to the configuration of the above-mentioned (10), when the inner member and the outer member approach each other, the oil can easily flow into the communication hole. In addition, here, the communication hole is formed to have a smaller diameter on an outward side in the radial direction that is an outlet side than on an inward side. For this reason, a better damping effect can be exhibited.

(11) In some embodiments, in the configuration according to any one of the above-mentioned (1) to (8), the communication hole may be formed to have a larger diameter on an outward side than on an inward side in the radial direction.

According to the configuration of the above-mentioned (11), when the inner member and the outer member are separated from each other, the oil can easily flow into the communication hole. In addition, here, the communication hole is formed to have a smaller diameter on an inward side in the radial direction that is an outlet side than on an outward side. For this reason, a better damping effect can be exhibited.

(12) In some embodiments, in the configuration according to any one of the above-mentioned (1) to (8), the communication hole may include a cylindrical section on an outward side in the radial direction, and a tapered section continuous with an inner end of the cylindrical section in the radial direction and expanding toward an inward side in the radial direction.

According to the configuration of the above-mentioned (12), the effect described in any one of the above-mentioned (1) to (8) can be exhibited by the holed member including the plurality of through-holes each including the cylindrical section and the tapered section in the radial direction.

(13) In some embodiments, in the configuration according to any one of the above-mentioned (1) to (6), the communication hole may be formed in a slit shape.

According to the configuration of the above-mentioned (13), when the shape of the communication hole is a slit shape, the effects described in any one of the above-mentioned (1) to (6) can be exhibited with a simple configuration.

(14) In some embodiments, in the configuration according to any one of the above-mentioned (1) to (13), the holed member may include a convex section having a region in which the communication hole is formed protruding inward in the radial direction; and a sealing support section configured to support the inner member from an outward side in the radial direction while sealing at least a part of the first region between the convex section and the inner member.

According to the configuration of the above-mentioned (14), the first region is sealed while the inner member is supported by the sealing support section. As a result, when the inner member is vibrated, the oil supplied to the first region can flow into the communication hole. Accordingly, the damping performance can be greatly improved by the squeeze film damper due to the resistance force applied when the oil passes through the communication hole.

(15) In some embodiments, in the configuration according to the above-mentioned (14), the sealing support section may include a seal member configured to seal at least the part of the first region; and a support mechanism configured to support the inner member.

According to the configuration of the above-mentioned (15), the first region can be sealed by the seal member. In addition, it is possible to configure the squeeze film damper to support the inner member using the support mechanism.

(16) In some embodiments, in the configuration according to the above-mentioned (15), the support mechanism may be a notch member formed integrally with the convex section and configured to be expandable in the radial direction, and the notch member may include an accommodating concave section configured to accommodate the seal member.

According to the configuration of the above-mentioned (16), the inner member can be supported by the notch member. In addition, when a seal is accommodated in the accommodating concave section of the notch member, the first region can be sealed. In addition, a rigidity of the notch member can be adjusted by adjusting a notch of the notch member.

(17) In some embodiments, in the configuration according to the above-mentioned (14), the sealing support section may be a bellows expandable in the radial direction.

According to the configuration of the above-mentioned (17), the first region can be sealed by the bellows while supporting the inner member. As a result, support of the inner member and sealing of the first region can be realized with one member. Accordingly, the effect described in the above-mentioned (14) can be exhibited with a simple configuration.

(18) In some embodiments, in the configuration according to any one of the above-mentioned (1) to (17), the gap may be open in at least a part of the axial end.

According to the configuration of the above-mentioned (18), the oil supplied to the first region and moved to the second region via the communication hole can be discharged from the axial end in which the second region is open.

(19) In some embodiments, in the configuration according to any one of the above-mentioned (14) to (17), the holed member may include a sealing member attached at the second region on an outward side in the radial direction and configured to seal the second region, the sealing member may include a thin film diaphragm at a boundary with the second region, a gas may be enclosed in a space formed by the sealing member, and the diaphragm may be deformable in the radial direction due to a pressure difference between the oil flowing through the second region and the gas.

According to the configuration of the above-mentioned (19), there is no need to provide a structure for circulating the oil supplied to the squeeze film damper by sealing the second region using the sealing member. That is, contamination of the oil with air when the oil is circulated is minimized. As a result, a decrease in damping performance of the squeeze film damper can be minimized.

The diaphragm is deformable by the pressure difference between the gas enclosed in the space formed by the sealing member and the oil passing through the second region. Accordingly, even in a state in which the sealing member seals the second region, the oil can pass through the first region and the second region via the communication hole. Accordingly, even in a state in which the second region is sealed, damping performance of the squeeze film damper can be greatly improved by receiving the resistance force when the oil flows into the communication hole.

(20) In some embodiments, in the configuration according to the above-mentioned (19), the sealing member may be detachably attached to the convex section.

According to the configuration of the above-mentioned (20), damping performance of the squeeze film damper can be smoothly adjusted by detachably attaching the sealing member to the convex section. Specifically, it is possible to adjust the pressure in the gas region of the sealing member. For this reason, it is possible to adjust the damping performance of the squeeze film damper.

(21) In some embodiments, a squeeze film damper including: an inner member configured to support a bearing unit; and a holed member provided circumferentially outward from the inner member at a predetermined interval from the inner member, wherein the holed member may include: at least one detachable unit; and an arc section having a space into which the unit is able to be inserted, the unit may include: a first member that is an end portion on an inward side in a radial direction and in contact with the inner member; a second member that is an end portion on an outward side in the radial direction, provided such that there is a gap between it and the first member and attached to the arc section; a third member provided in the gap and having a plurality of communication holes configured to allow a first region in the gap on an inward side in the radial direction and a second region in the gap on an outward side in the radial direction to be communicating; a sealing support section configured to support the first member from an outward side in the radial direction while sealing the first region; and a sealing member attached to the second member on an inward side in the radial direction and configured to seal the second region, the sealing member may include a thin film diaphragm on a boundary with the second region, a gas may be enclosed in a space formed by the sealing member, and the diaphragm may be deformable in the radial direction by a pressure difference between the gas and the oil flowing through the second region.

According to the configuration of the above-mentioned (21), an exchangeable unit is provided. Accordingly, the damping performance of the squeeze film damper can be adjusted by adjusting a gas pressure applied to the unit, changing a type of oil and adjusting a level of degasification of the oil.

(22) A rotary machine according to at least one embodiment of the present disclosure includes the squeeze film damper according to any one of the above-mentioned (1) to (21); a rotor shaft; and a bearing unit configured to rotatably support the rotor shaft.

According to the configuration of the above-mentioned (22), it is possible to obtain the rotary machine having a damping effect using the squeeze film damper described according to any one of the above-mentioned (1) to (21).

According to at least one embodiment of the present disclosure, improvement in damping performance of the squeeze film damper can be achieved with a simple configuration.

DETAILED DESCRIPTION OF THE INVENTION

First Embodiment

Figure 1:
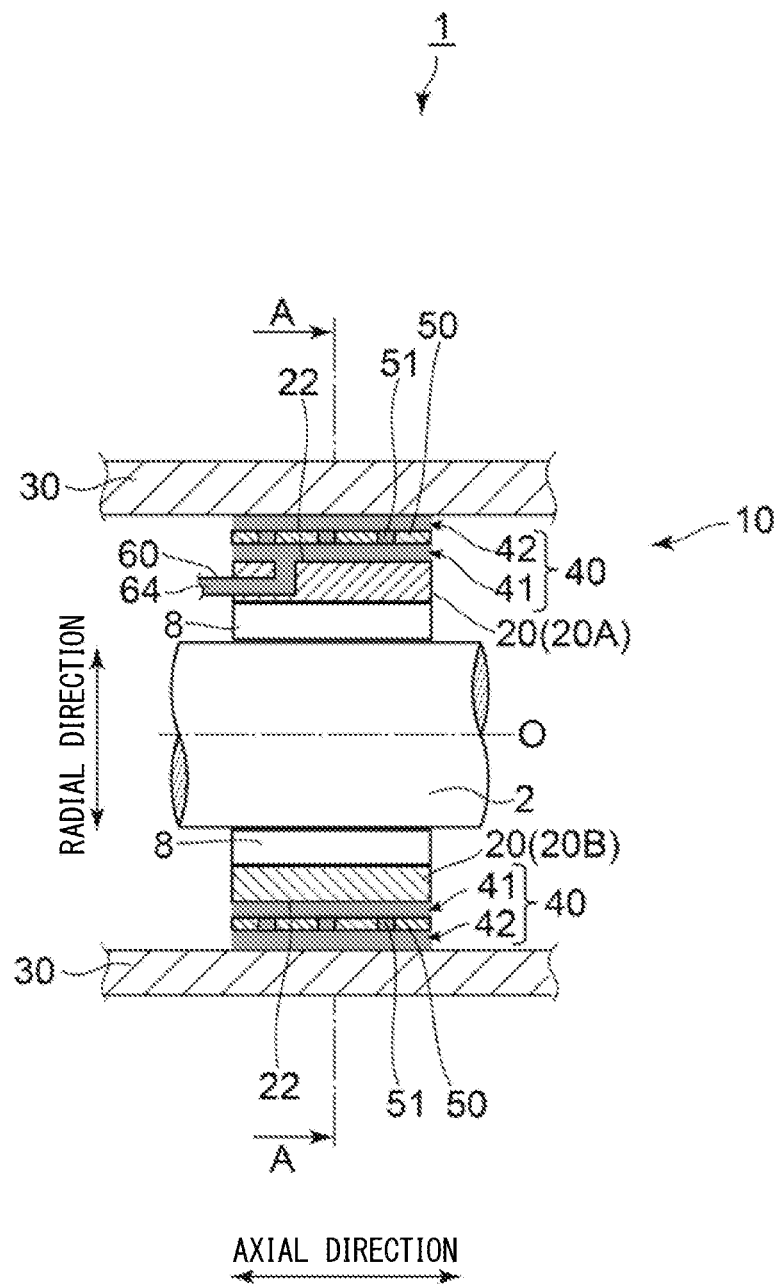
FIG. 1 is a lateral cross-sectional view showing a rotary machine according to a first embodiment.

Hereinafter, a first embodiment of the present invention will be described with reference to the accompanying drawings. However, dimensions, materials, shapes, relative arrangements, and the like, of components disclosed as the embodiment or shown in the drawings are not intended to limit the scope of the present invention, and are merely illustrative examples.

For example, expressions that express relative or absolute arrangements such as "in a direction," "along a direction," "parallel to," "perpendicular to," "central," "concentric," "coaxial," and the like, will not only strictly represent such as an arrangement but also represent a state of relative displacement with a tolerance, or an angle or a distance such that the same function can be obtained.

For example, expressions such as "the same," "identical," "homogeneous," and the like, indicating that things are in an equal state will not only represent strictly the same state but also represent a state in which there is a tolerance or a difference such that the same function can be obtained.

For example, expressions indicating a shape such as a quadrangular shape, a cylindrical shape, or the like, will not only represent a shape such as a quadrangular shape, a cylindrical shape, or the like, with such a strict geometrical shape but also represent shapes that include concavo-convex sections, chamfered sections, or the like, as long as the same effects can be obtained.

Meanwhile, expressions including "comprising," "including" or "having" a component are not exclusive representations excluding the existence of other components.

Figure 2:
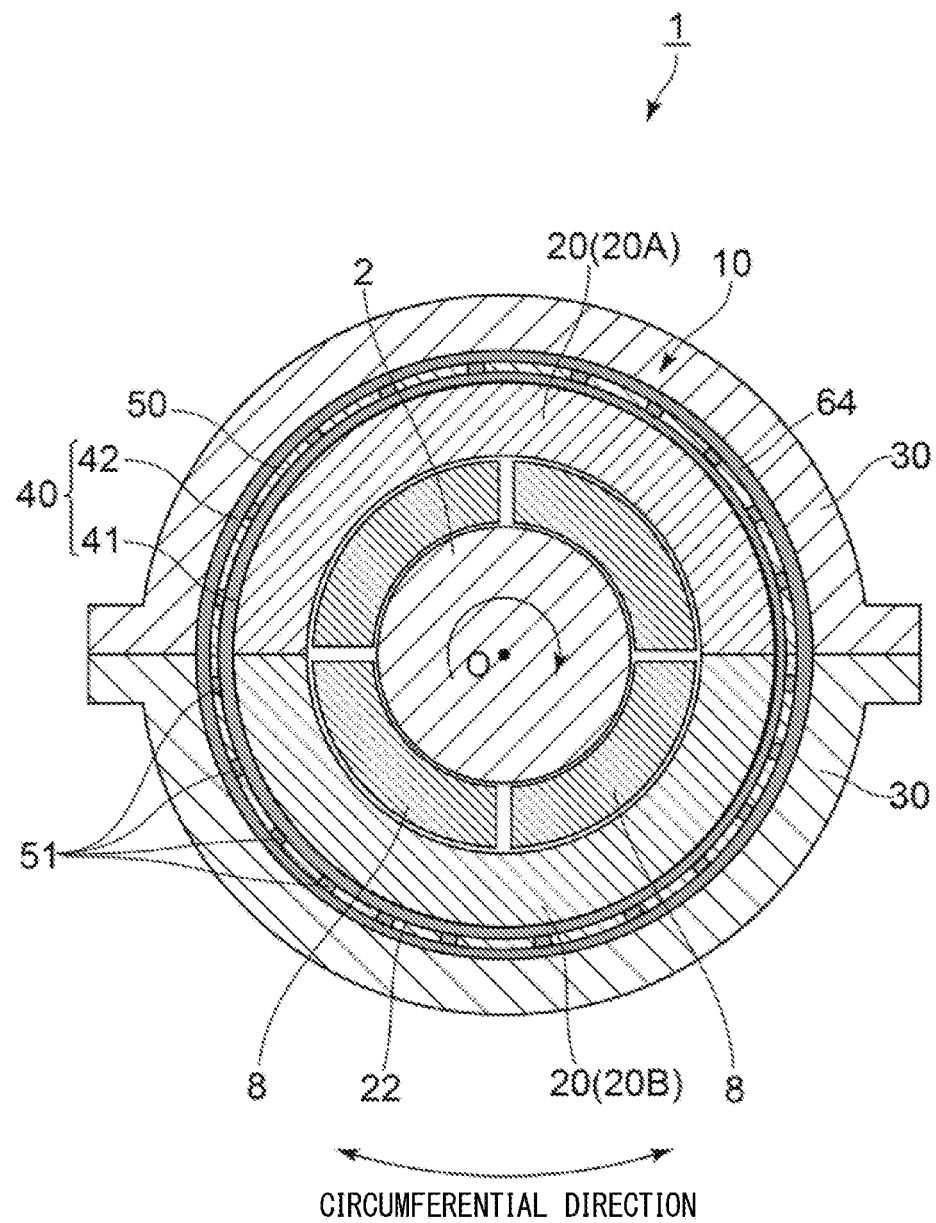
FIG. 2 is a cross-sectional view showing the rotary machine according to the first embodiment in an axial direction, which is a cross-sectional view taken along line A-A in FIG. 1.
Figure 3:
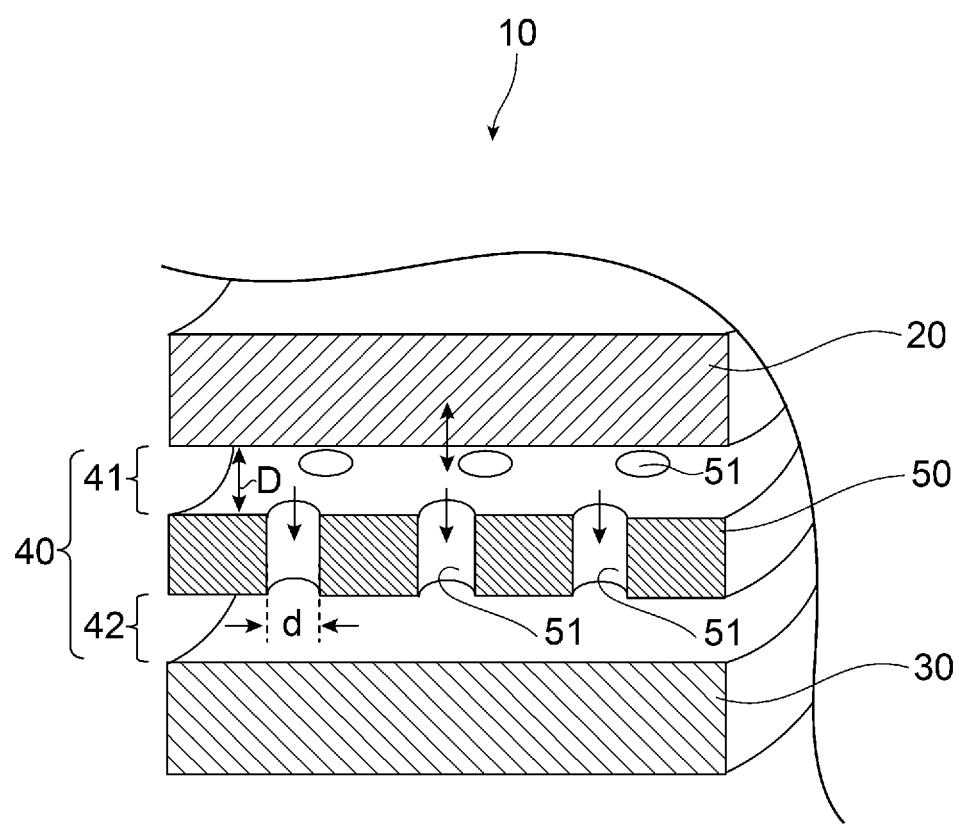
FIG. 3 is a partially enlarged view of a squeeze film damper according to the first embodiment.

FIG. 1 is a lateral cross-sectional view showing a rotary machine according to the first embodiment. FIG. 2 is a cross-sectional view showing the rotary machine according to the first embodiment in an axial direction, which is a cross-sectional view taken along line A-A in FIG. 1. FIG. 3 is a partially enlarged view of a squeeze film damper according to the first embodiment.

As shown in FIG. 1 to FIG. 3 non-limitingly, a rotary machine 1 according to the first embodiment includes a rotor shaft 2 that is rotatable, a bearing unit 8 configured to rotatably support the rotor shaft 2, and a squeeze film damper 10 configured to minimize vibrations of the bearing unit 8.

Figure 12A:
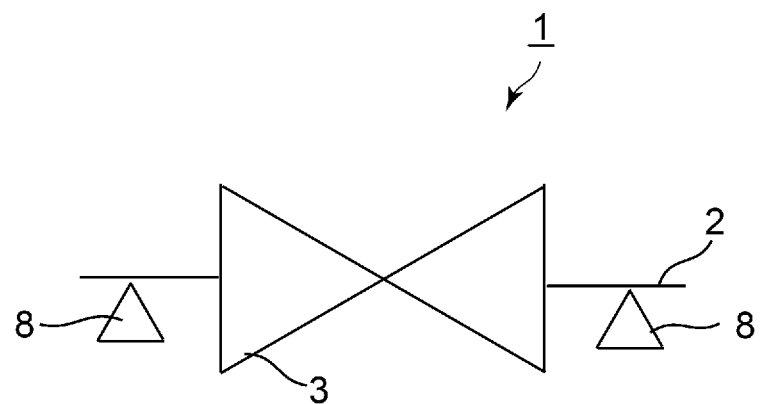
FIG. 12A is a schematic view showing a rotary machine (a steam turbine) according to an example of the first embodiment.
Figure 12B:
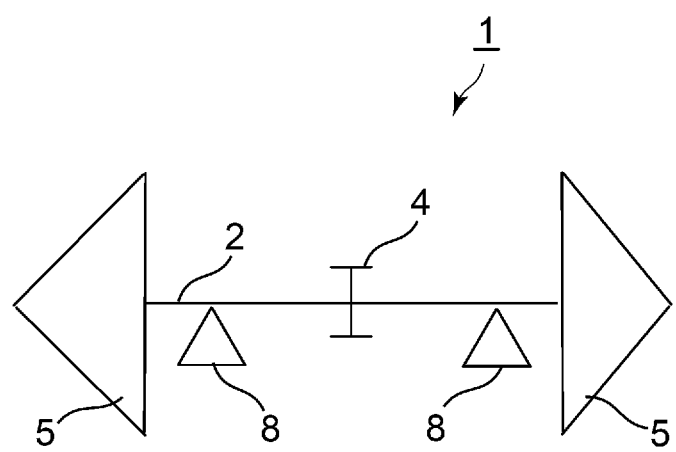
FIG. 12B is a view showing a rotary machine (a compressor) according to an example of the first embodiment.

For example, the rotary machine 1 may include various machines having a rotary shaft (for example, the rotor shaft 2) such as a gas turbine in which a hydrodynamic force from a working fluid is received by a rotor blade 3 and the rotor shaft 2 is rotated, a steam turbine (for example, see FIG. 12A), a turbo charger, a compressor (for example, see FIG. 12B) configured to rotate an impeller 5 and pump a fluid, an engine, or the like. Further, FIG. 12B schematically shows a geared compressor configured to support the rotor shaft 2 connected thereto via a gear 4 using the bearing unit 8.

The rotor shaft 2 is supported by the bearing unit 8 and can be disposed such that a central axis O thereof extends in a substantially horizontal direction. The rotor shaft 2 may be configured such that the central axis O can be substantially held by various core holding mechanisms. Further, detailed description of the core holding mechanisms configured to maintain the central axis O of the rotor shaft 2 will be omitted.

One or more rotor blade stages (not shown) having the plurality of rotor blades 3 may be attached to an outer circumference of the rotor shaft 2 in a circumferential direction.

The bearing unit 8 may be, for example, a journal bearing configured to support the rotor shaft 2 from a radial direction. Such a bearing unit 8 can be configured as, for example, a bearing metal having an annular cross-sectional shape when seen in an axial direction of the rotor shaft 2. In addition, the bearing unit 8 may be configured as a bearing pad having a cross section that is an arc shape or a fan shape when seen in the axial direction of the rotor shaft 2 by dividing a tubular or annular bearing member into a plurality of (for example, 2 to 4) parts in a circumferential direction.

The bearing pad as the bearing unit 8 may include a so-called tilting pad bearing tiltably supported by, for example, a pivot 9 (see FIG. 6), in addition to a fixed type that does not tilt.

Each of the bearing units 8 is disposed to support at least a lower portion of the rotor shaft 2 extending in a substantially horizontal direction. For example, a configuration of supporting a lower section of the rotor shaft 2 using one bearing unit 8 may be provided. An outer circumference of the rotor shaft 2 may be supported by the plurality of bearing units 8 from a plurality of directions.

Further, FIG. 2 shows a configuration example in which the outer circumference of the rotor shaft 2 is slidably supported by the four bearing units 8 that are divided into left, right, upper and lower sides when seen in the axial direction. However, the number of separate bearing units 8 in the circumferential direction and the disposition of the separate bearing units 8 (or gaps therebetween) in the circumferential direction can be arbitrarily set according to a specification of the rotary machine 1 to which the bearing units 8 are applied.

Then, oil 64 is supplied from an oil supply line (not shown) to a space between the rotor shaft 2 and the bearing unit 8. Accordingly, an oil film is formed between the rotor shaft 2 and the bearing unit 8 when the rotor shaft 2 is rotated. As a result, a direct metal contact between the rotor shaft 2 and the bearing unit 8 can be prevented and the rotor shaft 2 can be smoothly rotated.

Next, the squeeze film damper 10 according to at least the embodiment of the present disclosure will be described in detail with reference to FIG. 1 to FIG. 3.

As shown in FIG. 1 to FIG. 3 non-limitingly, the squeeze film damper 10 according to at least the embodiment of the present disclosure is a so-called back damper provided circumferentially outward from the bearing unit 8. The squeeze film damper 10 includes an inner member 20, an outer member 30, a holed member 50 and an oil supply path 60. The inner member 20 supports the bearing unit 8. The outer member 30 is provided circumferentially outward from the inner member 20 to face the inner member 20 with a gap 40 extending in the circumferential direction and interposed therebetween. The holed member 50 is provided in the gap 40. The holed member 50 has a plurality of communication holes 51 that allows communication between a first region 41 on an inward side of the gap 40 in the radial direction and a second region 42 on an outward side of the gap 40 in the radial direction. The oil supply path 60 includes the oil supply path 60 configured to supply the oil 64 to the first region 41.

The inner member 20 may be, for example, an annular or tubular damper journal (also referred to as a carrier ring or a bearing housing) provided around the bearing unit 8. A bearing housing as the inner member 20 may be constituted by an upper housing 20A having a half-cylindrical shape and a lower housing 20B having a half-cylindrical shape. The inner member 20 may be disposed coaxially with the rotor shaft 2 and the bearing unit 8, and can be configured such that the bearing unit 8 is supported from an outward side of the bearing unit 8 in the radial direction.

The outer member 30 may be a tubular body (or an annular body) disposed coaxially with the inner member 20 such that an outer circumferential surface 22 of the inner member 20 is covered throughout the region in the circumferential direction. The outer member 30 can be disposed with a predetermined gap 40 between the inner member 20 and the outer member 30.

The gap 40 may be formed throughout in the circumferential direction (for example, see FIG. 2). That is, the gap 40 can be configured in an annular shape when seen in the axial direction such that the oil film is formed between the inner member 20 and the outer member 30 throughout in the circumferential direction. Such a gap 40 may be configured to have a constant interval throughout in the circumferential direction when the rotary machine 1 is stopped. In addition, for example, the gap 40 may be formed within at least a partial range in the circumferential direction. The gap 40 in this case may be formed in at least one place in the circumferential direction. The gap 40 may be divided and provided at a plurality of places in the circumferential direction. The gap 40 may be provided in at least a part in the circumferential direction to overlap the part in the radial direction. That is, the squeeze film damper 10 having such a gap 40 may include, for example, an integrated squeeze film damper (ISFD) (R).

The holed member 50 is loosely inserted into the gap 40 between the inner member 20 and the outer member 30 to surround an outer circumference of the inner member 20. The holed member 50 may be disposed coaxially with the rotor shaft 2, the bearing unit 8, the inner member 20 and the outer member 30. The holed member 50 can be formed as a substantially tubular or annular member having a diameter larger than an outer circumference of the inner member 20 and smaller than an inner circumference of the outer member 30. While the material of the holed member 50 is not particularly limited, for example, the holed member 50 may be formed of the same material as the outer member 30.

The communication hole 51 is a so-called orifice hole. The plurality of communication holes 51 are provided throughout in the axial direction and the circumferential direction of the holed member 50 to communicate with the first region 41 and the second region 42. For example, the communication holes 51 may be disposed in parallel at equal intervals in the axial direction or the circumferential direction.

The first region 41 and the second region 42 of the gap 40 disposed to be spaced apart from the holed member 50 may have substantially the same interval therebetween in the radial direction of the rotor shaft 2.

The oil supply path 60 is configured to guide the oil 64 to the first region 41 of the gap 40 from the axial direction or the radial direction of the rotor shaft 2. That is, the squeeze film damper 10 of the present disclosure is configured such that the oil 64 is moved to the second region 42 on an outward side in the radial direction from the first region 41 on an inward side in the radial direction via the communication holes 51 of the holed member 50. The oil supply path 60 can be disposed on an upstream side or a downstream side in a flow direction of a working fluid (not shown) that applies a hydrodynamic force to the rotor blade 3 in the axial direction of the rotor shaft 2. An arrangement and the number of the oil supply paths 60 in the circumferential direction are not particularly limited. For example, FIG. 1 non-limitingly shows an example in which the oil supply path 60 is provided on an upstream side of a flow of a working fluid in the axial direction.

In the above-mentioned configuration, the oil 64 is supplied to the first region 41 of the gap 40 via the oil supply path 60. As a result, the oil 64 flows into the second region 42 from the first region 41 via the communication holes 51 due to the weight of the oil 64 (for example, a relatively lower region in the circumferential direction) or the pressure of the oil 64 supplied into the first region 41. Accordingly, an oil film is formed in the gap 40 including the first region 41 and the second region 42.

In this state, for example, when the bearing unit 8 and the inner member 20 supporting the bearing unit 8 are vibrated according to rotation of the rotor shaft 2, an interval between the outer circumferential surface 22 of the inner member 20 and the inner circumferential surface of the holed member 50, i.e., an interval of the first region 41 varies according to the vibrations. According to the variation in interval, the oil film formed of the oil 64 in the first region 41 is moved in the axial direction or the circumferential direction. As a result, a pressure is generated due to a so-called squeeze action caused by a viscous resistance of the oil 64 according to the movement, and a damping effect with respect to the vibrations is obtained.

Further, according to the squeeze film damper 10 of the present disclosure, the holed member 50 including the plurality of communication holes 51 communicating with the first region 41 on an inward side in the radial direction and the second region 42 on an outward side in the radial direction is disposed in the gap 40 between the inner member 20 and the outer member 30. According to the configuration, for example, when the bearing units 8 and the inner member 20 supporting them are vibrated according to rotation of the rotor shaft 2, a part of the oil 64 passes through the communication holes 51 of the holed member 50 while following the outer circumferential surface 22 of the inner member 20. The oil 64 receives a resistance force during the passage. That is, in addition to the squeeze effect in the related art, the oil 64 passing through the communication holes 51 of the holed member 50 functions as a damper with respect to vibrations of the bearing unit 8 and the inner member 20. For this reason, damping performance of the squeeze film damper 10 can be greatly improved using a simple configuration.

Further, a damping effect of the holed member 50 can be adjusted by arbitrarily setting, for example, the number, a size, disposition, orientation, a shape, or the like, of the communication holes 51 according to vibration characteristics of the rotary machine 1 on which the holed members 50 are mounted.

In addition, in some examples of the embodiment, a gap 42 may be open at least partially at an axial end thereof (see FIG. 1). In this case, at least a part of an axial end of at least the second region 42 may be open. That is, the axial end of the first region 41 may be open or may be closed. For example, such a configuration can be arbitrarily set according to disposition or a shape of an end plate (not shown) provided on one side in the axial direction with respect to the bearing unit 8 (for example, an upstream side in a flow direction of a working fluid) and the other side (a downstream side in the same direction). Further, an axial end of the second region 42 may have a configuration in which any one of an upstream side and a downstream side in the flow direction of the working fluid may be open at one side and may be closed at the other side, or a part in the circumferential direction may be open.

According to the configuration in which at least a part of the axial end of the gap 42 is open in this way, the oil 64 supplied to the first region 41 and moved to the second region 42 via the communication holes 51 can be discharged from the axial end of the second region 42, which is open.

In some cases of the embodiment, a dimension D between the inner member 20 and the holed member 50 and a diameter d of the communication holes 51 may satisfy 0.1d<D<10d (see FIG. 3).

A damping effect by the oil 64 passing through the communication holes 51 may not be obtained properly when the diameter of the communication holes 51 is too large or too small.

At this point, according to the configuration, the diameter d of the communication holes 51 satisfies a range of the same order with respect to the dimension D of the gap (the first region 41) between the inner member 20 and the holed member 50. For this reason, the communication holes 51 can be adjusted to provide appropriate damping characteristics by arbitrarily setting the number, size, arrangement, orientation, and shape thereof according to vibration characteristics of the rotary machine 1 on which the holed members 50 are mounted.

Figure 4A:
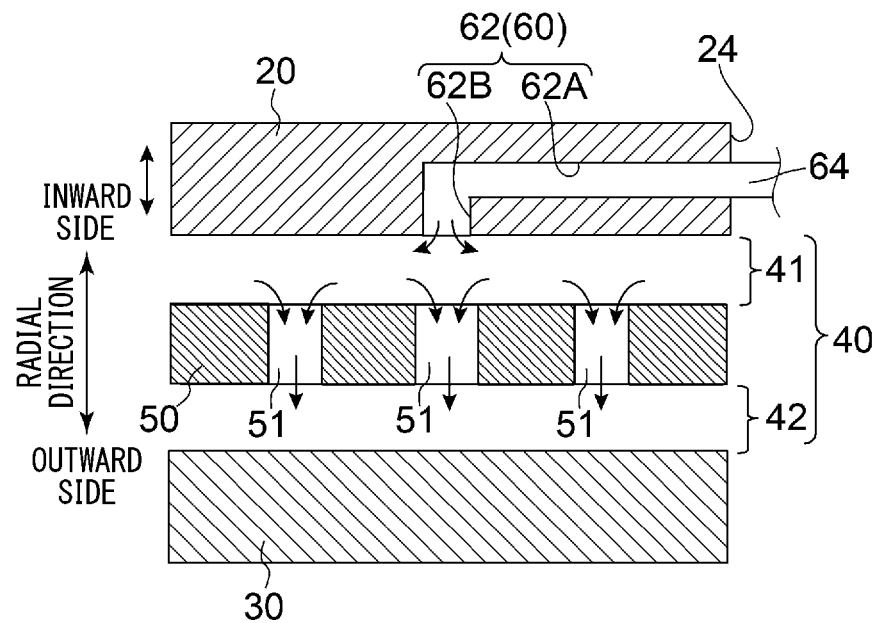
FIG. 4A is a partially enlarged view of a squeeze film damper according to another example of the first embodiment, showing a case in which a radial extension section is disposed in an axial extension section in an internal flow path.
Figure 4B:
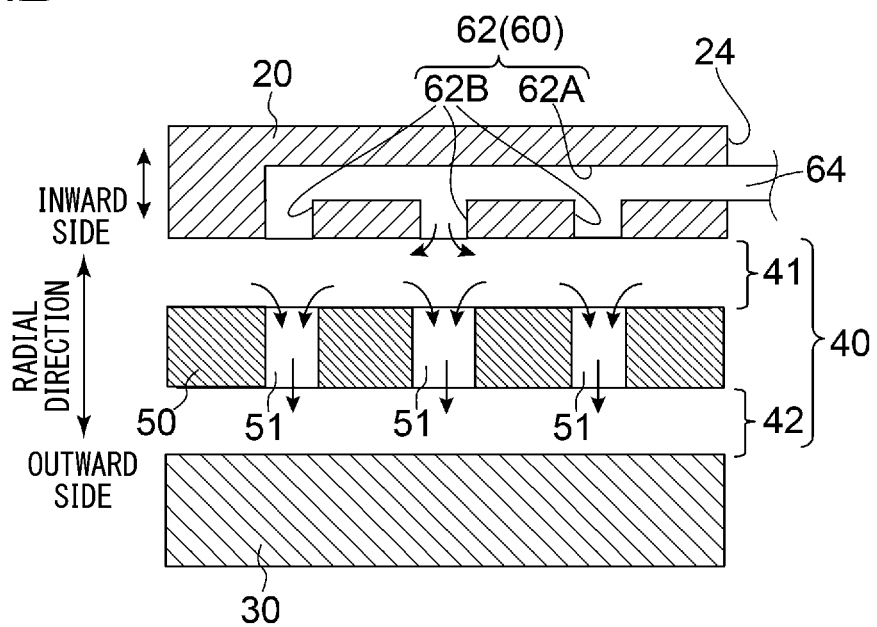
FIG. 4B is a partially enlarged view of a squeeze film damper according to another example of the first embodiment, showing a case in which a plurality of radial extension sections, which are the same, are disposed.

FIG. 4A and FIG. 4B are partially enlarged views of a squeeze film damper according to another example of the first embodiment. As shown in FIG. 4A and FIG. 4B non-limitingly, the oil supply path 60 in some embodiments may include an internal flow path 62 configured to introduce the oil 64 into the first region 41 from an axial end portion 24 of the inner member 20.

The internal flow path 62 may be formed in at least a part of the inner member 20 in the circumferential direction, or may be formed at a plurality of places (for example, at equal intervals) in the circumferential direction.

According to the configuration in which the internal flow path 62 is provided in this way, the oil 64 can be supplied to the first region 41 by supplying the oil 64 to the internal flow path 62 from the axial end portion 24 of the inner member 20. For this reason, for example, there is no need to provide a route for the oil 64 to pass through the outer member 30 and the holed member 50 in the radial direction. That is, the effects described in some embodiments of the present disclosure can be exhibited according to a simple configuration in which the oil 64 is supplied to the internal flow path 62 from the axial end portion 24 of the inner member 20.

Further, the internal flow path 62 in some examples of the first embodiment may include an axial extension section 62A extending from the axial end portion 24 in the axial direction, and a radial extension section 62B continuous with the axial extension section 62A and extending in the radial direction (see FIG. 4A and FIG. 4B).

According to the above-mentioned configuration, the oil 64 supplied to the internal flow path 62 from the axial end portion 24 of the inner member 20 is supplied to the first region 41 via the axial extension section 62A and the radial extension section 62B. Accordingly, a degree of design freedom of the internal flow path 62 can be improved.

Further, in the case of the internal flow path 62 including the axial extension section 62A and the radial extension section 62B in this way, one (see FIG. 4A) or a plurality of (see FIG. 4B) radial extension sections 62B may be formed on one axial extension section 62A. In this way, the oil 64 introduced to the axial extension section 62A is supplied to the first region 41 via the one or the plurality of radial extension sections 62B continuous with the axial extension section 62A and extending in the radial direction. Accordingly, a desired number of radial extension sections 62B are formed to be continuous with the one axial extension section 62A. Accordingly, the oil 64 can be supplied to the first region 41 from one or a plurality of appropriate places in the axial direction to form the oil film at a position in the circumferential direction where the internal flow path 62 in the inner member 20 is provided.

Further, the internal flow path 62 may include a circumferential extension section (not shown) configured to introduce the oil 64 in the circumferential direction of the inner member 20 in the inner member 20.

Figure 5:
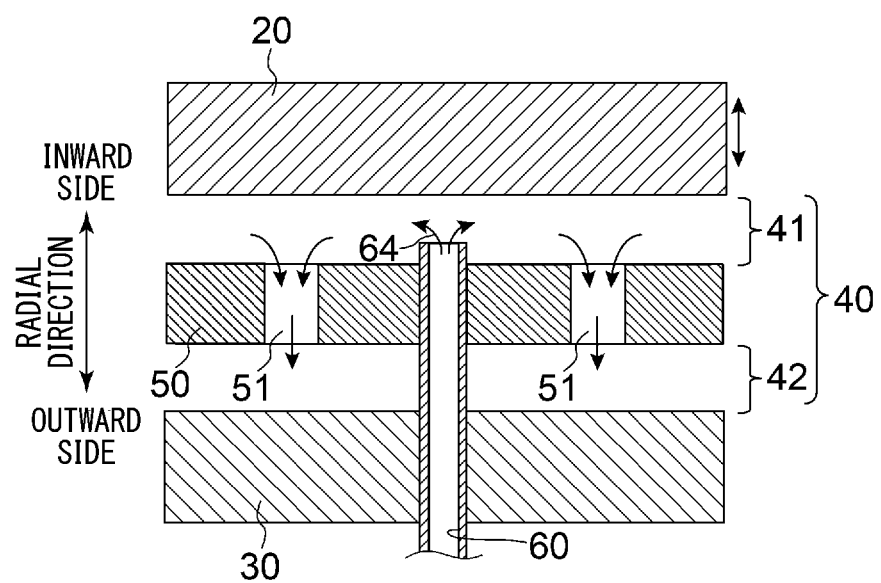
FIG. 5 is a partially enlarged view of a squeeze film damper according to another example of the first embodiment.

FIG. 5 is a partially enlarged view of a squeeze film damper according to another example of the first embodiment. As shown in FIG. 5 non-limitingly, the oil supply path 60 in some embodiments may be configured to supply the oil 64 to the first region 41 through the outer member 30 and the holed member 50 in the radial direction. One or a plurality of oil supply paths 60 may be provided in the circumferential direction or the axial direction.

In this way, the oil 64 is supplied to the first region 41 via the oil supply path 60 passing through the outer member 30 and the holed member 50 in the radial direction. According to the above-mentioned configuration, the effects of the present disclosure can be exhibited with a simple configuration in which a contact area of the oil supply path 60 in the axial direction of the inner member 20 is minimized.

Figure 6:
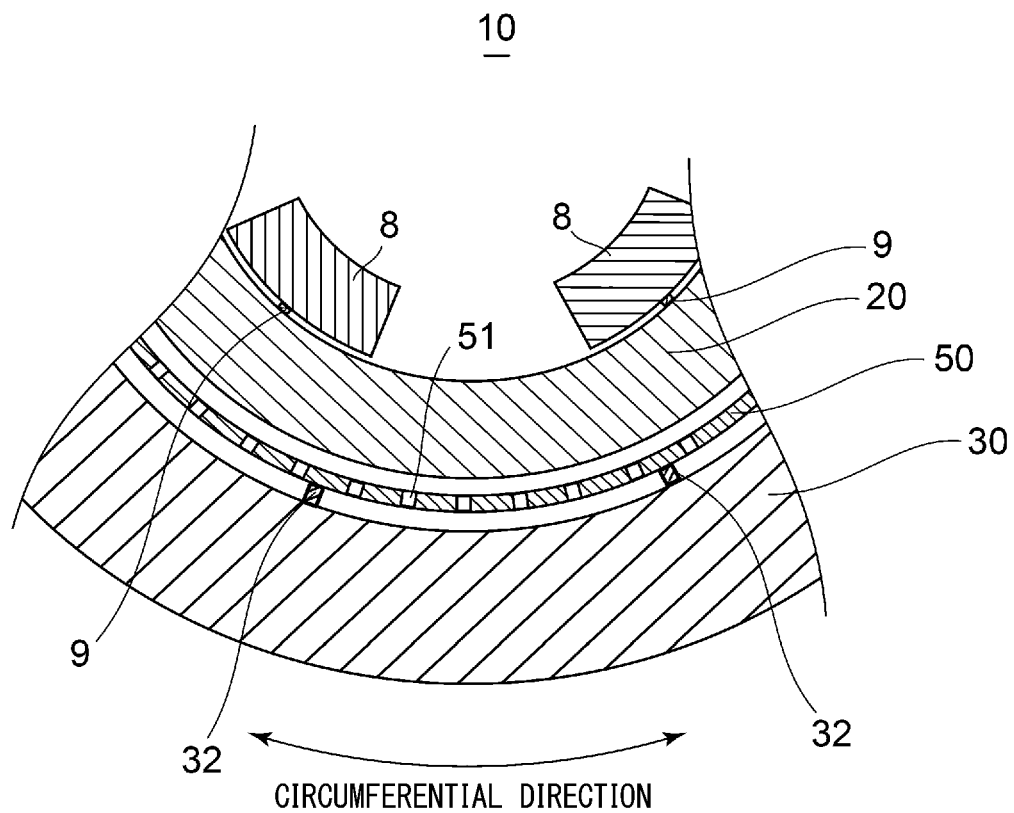
FIG. 6 is a schematic view showing a squeeze film damper according to another example of the first embodiment.

FIG. 6 is a schematic view showing a squeeze film damper according to another example of the first embodiment. As shown in FIG. 6 non-limitingly, the holed member 50 in some embodiments may be supported by the outer member 30 at a plurality of places at equal intervals in the circumferential direction.

The above-mentioned configuration can be accomplished by providing, for example, a support section 32 configured to fixedly connect the holed member 50 and the outer member 30. For example, the support section 32 may be configured to connect the outer circumferential surface of the holed member 50 and the inner circumferential surface of the outer member 30 (see FIG. 6). The support section 32 may be configured to connect axial end portions of the holed member 50 and the outer member 30. When the support section 32 is provided in (the second region 42) between the holed member 50 and the outer member 30, the support sections 32 may be formed to extend at least partially in the axial direction.

Relative movement between the holed member 50 and the outer member 30 can be restricted by supporting the holed member 50 using the outer member 30 in this way. In addition, the holed member 50 is supported at a plurality of places at intervals in the circumferential direction. Accordingly, for example, both of the holed member 50 and the outer member 30 can be more strongly fixed than in the case in which the holed member 50 is supported at one place in the circumferential direction. According to the above-mentioned configuration, for example, when the bearing unit 8 and the inner member 20 are vibrated, the inner member 20 relatively approaches and moves away from the holed member 50 supported by the outer member 30. Accordingly, whenever the inner member 20 is vibrated, the oil 64 can effectively pass through the communication holes 51 of the holed member 50. For this reason, the damping effect due to the holed member 50 can be more efficiently exhibited.

Next, a configuration of the communication holes 51 will be described.

For example, the communication holes 51 in some examples may be formed in a tubular shape as exemplarily shown in FIG. 1 to FIG. 6. In this case, the communication holes 51 may be formed to extend such that a central axis of the tubular shape extends in the radial direction (for example, see FIG. 3).

In this way, by making the shape of the communication holes 51 the tubular shape extending in the radial direction, the effect described in any one embodiment of the present disclosure can be exhibited with a simple configuration.

Figure 7:
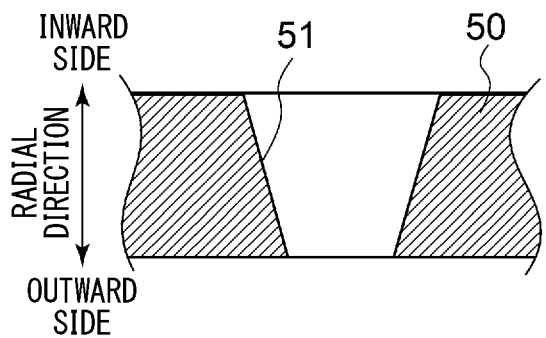
FIG. 7 is a schematic view showing a communication hole according to another example of the first embodiment.

FIG. 7 to FIG. 10 are schematic views showing communication holes according to another example of the first embodiment. For example, as shown in FIG. 7, the communication holes 51 in some examples may be formed have a smaller diameter on an outward side than on an inward side in the radial direction. For example, the communication holes 51 can be formed in a frusto-conical shape having a smaller diameter on an outward side than on an inward side in the radial direction.

According to the above-mentioned configuration, when the inner member 20 and the outer member 30 approach each other, the oil 64 can easily flow into the communication holes 51. In addition, here, the communication holes 51 have a smaller diameter on an outward side, which is on the side of an outlet, than on an inward side in the radial direction. For this reason, a better damping effect can be exhibited.

Figure 8:
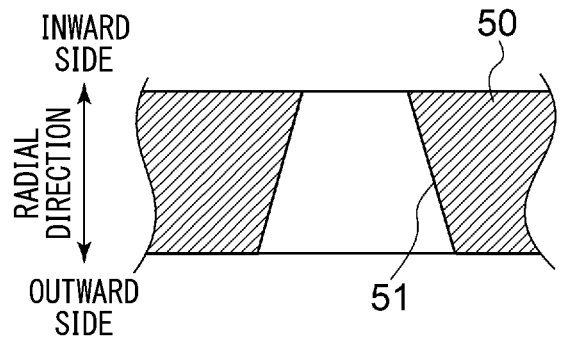
FIG. 8 is a schematic view showing a communication hole according to another example of the first embodiment.

In addition, for example, as shown in FIG. 8, the communication holes 51 in some examples may have a larger diameter on an outward side than on an inward side in the radial direction. For example, the communication holes 51 can be formed in a frusto-conical shape having a larger diameter on an outward side than on an inward side in the radial direction.

According to the configuration, when the inner member 20 and the outer member 30 are separated from each other, the oil 64 can easily flow into the communication holes 51. In addition, here, the communication holes 51 have a smaller diameter on an inward side, which is on the side of the outlet, than on an inward side in the radial direction. For this reason, a better damping effect can be exhibited.

Figure 9:
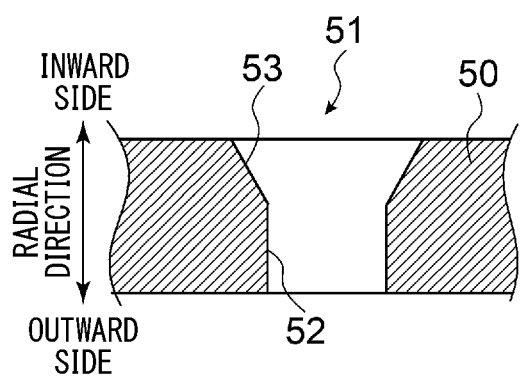
FIG. 9 is a schematic view showing a communication hole according to another example of the first embodiment.

In addition, for example, as shown in FIG. 9, the communication hole 51 in some examples may include a cylindrical section 52 on an outward side in the radial direction, and a tapered section 53 continuous with an inner end of the cylindrical section 52 in the radial direction and opening widely inward in the radial direction.

According to the above-mentioned configuration, the effect described in any one of the present disclosure can be exhibited by the holed member 50 including the plurality of communication holes 51 each including the cylindrical section 52 and the tapered section 53 in the radial direction.

Figure 10:
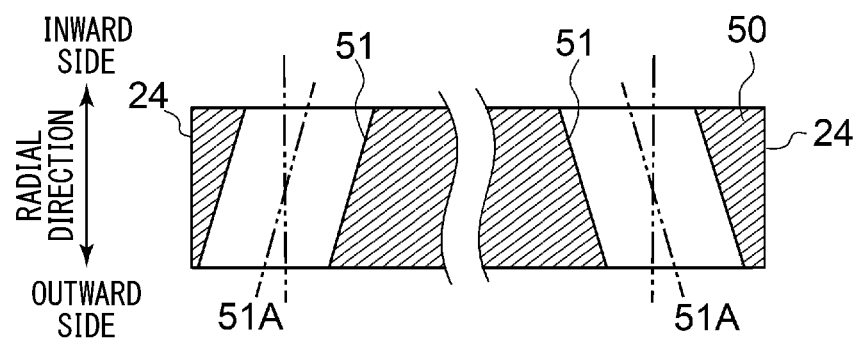
FIG. 10 is a schematic view showing a communication hole according to another example of the first embodiment.

Further, in some examples, for example, as shown in FIG. 10, a central axis 51A of the communication holes 51 disposed at least on a side of the holed member 50 closest to the axial end portion 24 may be inclined from the radial direction such that an outward side rather than on an inward side in the radial direction comes closer to the axial end portion 24.

When the inner member 20 comes closer to the outer member 30 having a tubular shape to be inscribed therein due to vibrations, the oil 64 intervening in the gap 40 therebetween moves in the axial direction as well as in the circumferential direction.

In this respect, the central axis 51A of the communication hole 51 is inclined from the radial direction such that an outward side is closer to the axial end portion 24 than an inward side in the radial direction. According to the above-mentioned configuration, the oil 64 having a velocity component toward the axial end portion can easily flow into the communication holes 51 when the oil 64 is pushed toward the axial end portion 24. Accordingly, the damping effect by the communication holes 51 can be more effectively exhibited.

Figure 11A:
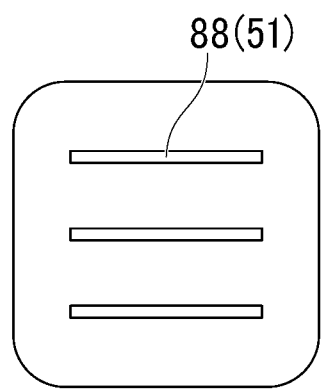
FIG. 11A is a schematic view showing a communication hole according to another example of the first embodiment.
Figure 11B:
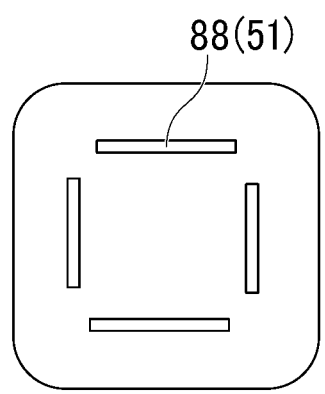
FIG. 11B is a schematic view showing a communication hole according to another example of the first embodiment.

Further, for example, as shown in FIGS. 11A and 11B, the communication holes 51 in some examples may be slits 88. In this way, when the communication holes 51 are formed as the slits 88, the effect described in any one of the present disclosure can be exhibited by a simple configuration. Further, arrangement of the slits 88 is not particularly limited, and as shown in FIG. 11A, the plurality of slits 88 may be disposed such that longitudinal directions thereof are oriented in the same direction. In addition, as shown in FIG. 11B, the slits 88 may be disposed such that the longitudinal directions are oriented in different directions.

Hereinabove, the first embodiment of the present disclosure has been described with reference to the accompanying drawings. Further, the present disclosure is not limited to the above-mentioned embodiment, and also includes forms obtained by modifying the above-mentioned embodiment, or forms obtained by appropriately combining these forms. For example, the shape, number, arrangement, arrangement interval, and the like, of the communication holes 51 are not particularly limited.

Second Embodiment

Figure 13:
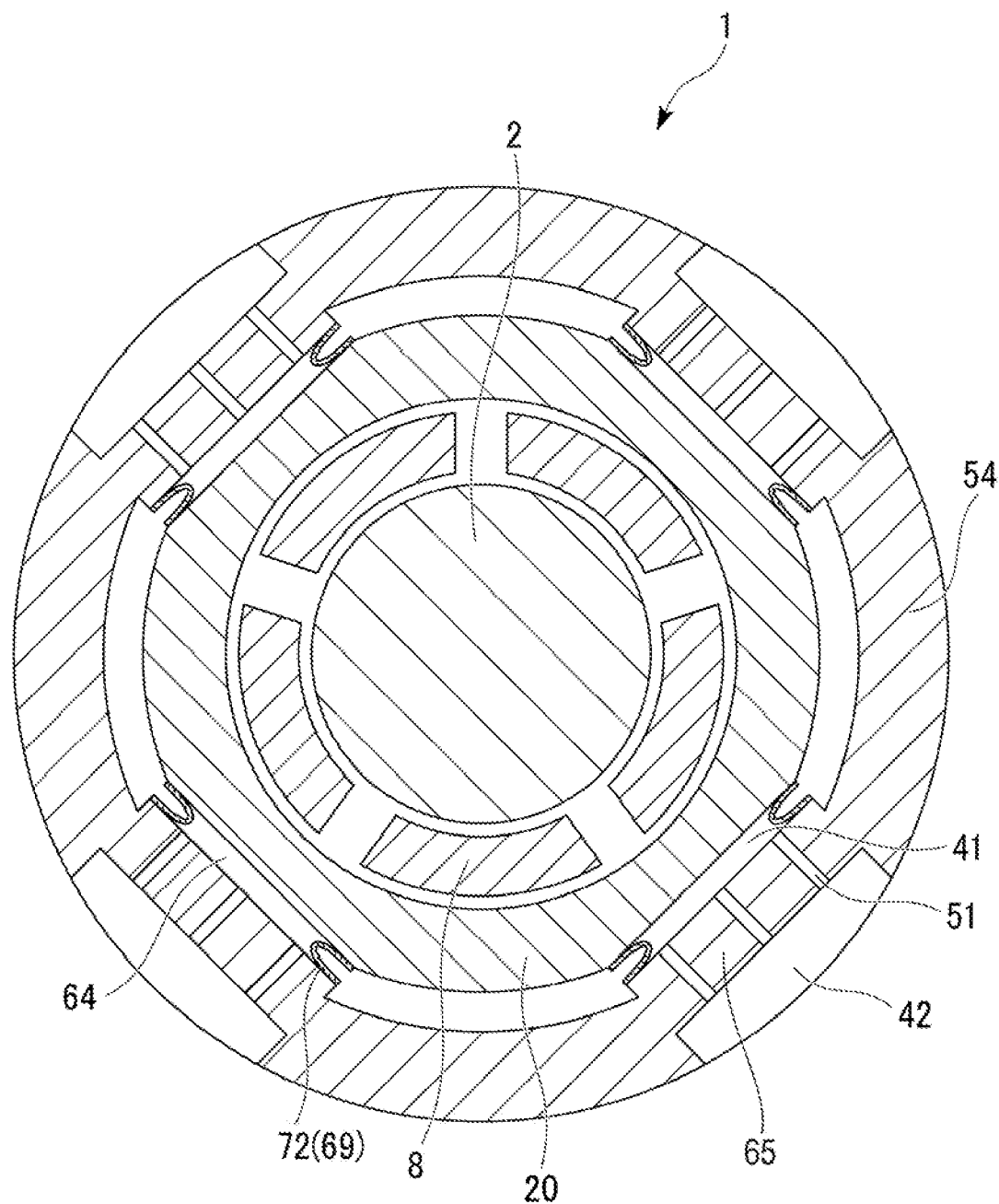
FIG. 13 is a cross-sectional view showing a rotary machine according to a second embodiment in an axial direction.
Figure 14A:
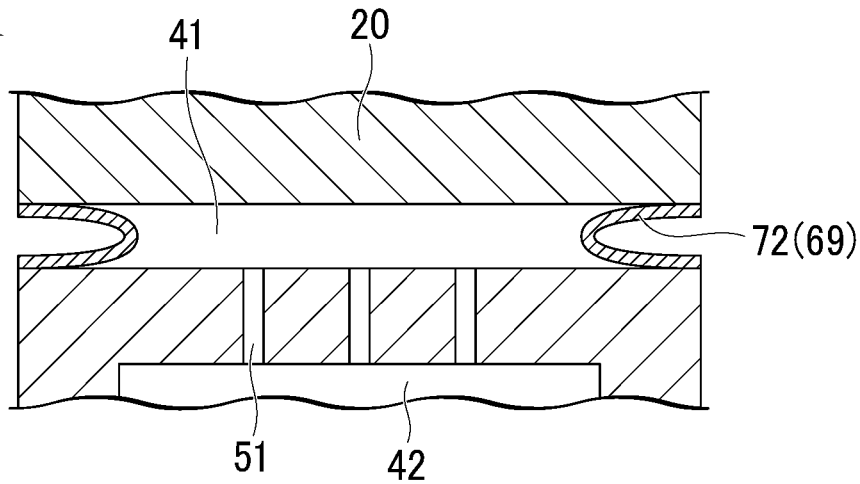
FIG. 14A is a view showing a seal member and a support mechanism according to the second embodiment.
Figure 14B:
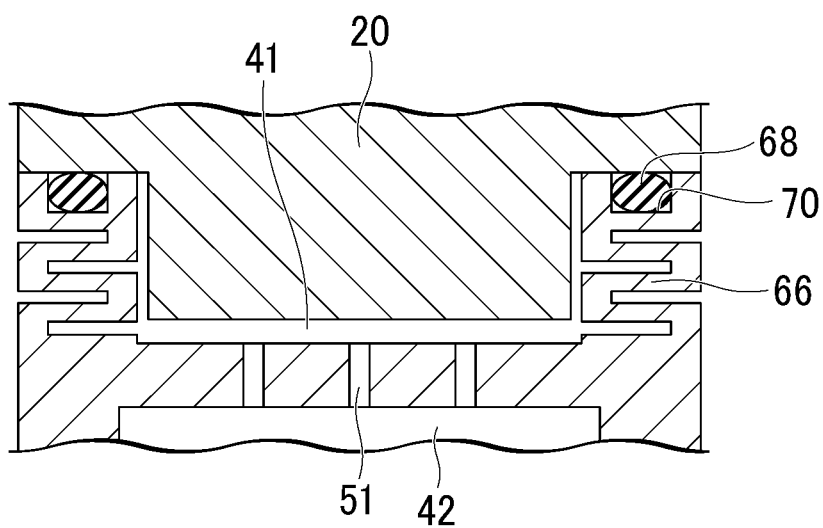
FIG. 14B is a view showing a seal member and a core holding mechanism according to another example of the second embodiment.
Figure 14C:
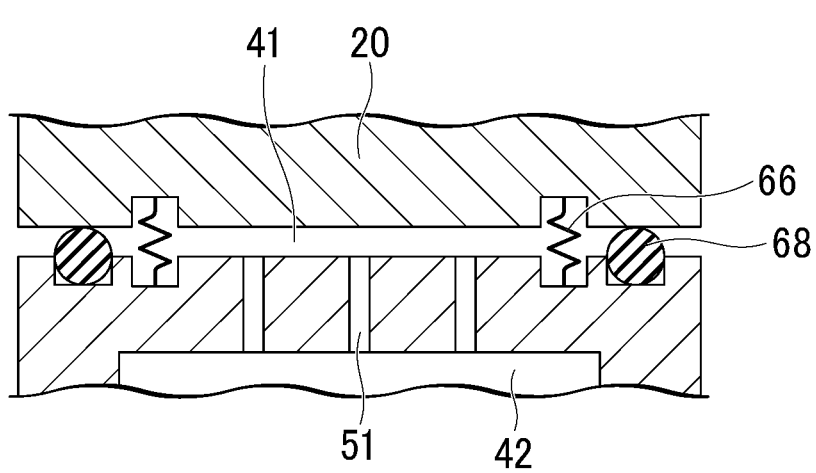
FIG. 14C is a view showing a seal member and a core holding mechanism according to another example of the second embodiment.

Hereinafter, a second embodiment of the present disclosure will be described with reference to FIG. 13 and FIG. 14. In the second embodiment, the same components as those of the first embodiment are designated by the same reference numerals, and detailed description thereof will be omitted. FIG. 13 is a cross-sectional view showing a rotary machine according to a second embodiment of the present disclosure in an axial direction. FIG. 14A is a view showing a seal member and a support mechanism according to the second embodiment of the present invention. FIGS. 14B and 14C are views showing a seal member and a support mechanism according to another example of the second embodiment.

As shown in FIG. 13, in the second embodiment, when a region of a holed member 54 in which the communication holes 51 are formed protrudes inward in the radial direction, a convex section 65 is formed. The plurality of convex sections 65 are provided at intervals in the circumferential direction. At this time, the first region 41 is formed in the gap between the convex section 65 and the inner member 20. The second region 42 is formed outside the convex section 65 in the radial direction. At this time, a region between the neighboring convex sections 65 in the circumferential direction is attached to an outer member (not shown) and fixed. In addition, a portion of the inner circumferential surface of the inner member 20 facing the convex section 65 in the radial direction becomes flat.

The convex section 65 has a sealing support section 69 configured to seal the first region 41 in addition to the communication holes 51 and support the inner member 20 from an outward side in the radial direction. In the case of the embodiment, as shown in FIG. 14A, the sealing support section 69 is a bellows 72 formed of a material having elasticity and expandable in the radial direction. When the bellows 72 is disposed at an axial end portion and a circumferential end portion of the first region 41, the first region 41 is sealed in the circumferential direction and the axial direction. In addition, one end of the bellows 72 in the radial direction comes in contact with the convex section 65. The other end of the bellows 72 in the radial direction comes in contact with the outer circumferential surface 22 of the inner member 20. Accordingly, the bellows 72 is expandable in the radial direction according to a variation in interval of the first regions 41, and the bellows 72 supports the inner member 20 from an outward side in the radial direction. Here, while the first region 41 is sealed by the bellows 72, the axial end portion of the second region 42 is released.

The configuration described in the first embodiment is applied to the communication holes 51. In one example, the communication hole 51 may be formed in a circular shape in the radial direction like an orifice hole described in the first embodiment or may be the slits 88. The plurality of communication holes 51 are disposed regularly in the inner circumferential surface of the convex section 65.

In the above-mentioned configuration, when the oil 64 is supplied to the first region 41 through an oil supply path (not shown), the oil 64 flows into the second region 42 from the first region 41 via the communication holes 51 due to the weight of the oil 64 or the pressure of the oil 64 supplied into the first region 41. As a result, the oil film is formed in the gap 40 including the first region 41 and the second region 42. Further, in one example, the oil supply path 60 described in the first embodiment is applied to the oil supply path.

In this state, for example, when the bearing units 8 and the inner member 20 configured to support the bearing units 8 are vibrated according to rotation of the rotor shaft 2, an interval between the outer circumferential surface 22 of the inner member 20 and the inner circumferential surface of the convex section 65, i.e., an interval of the first region 41 is varied according to the vibrations. According to the variation in interval, the pressure is generated by a so-called squeeze action due to a viscous resistance of the oil 64 in the first region 41, and a damping effect with respect to the vibrations is obtained.

Further, according to the above-mentioned configuration, a configuration in which the holed member 54 including the plurality of communication holes 51 configured to allow the first region 41 on an inward side of the convex section 65 in the radial direction and the second region 42 on an outward side in the radial direction to communicate with each other is provided. According to the above-mentioned configuration, for example, when the bearing unit 8 and the inner member 20 configured to support the bearing unit 8 are vibrated according to rotation of the rotor shaft 2, some of the oil 64 passes through the communication holes 51 of the holed member 54 to follow the outer circumferential surface 22 of the inner member 20. The oil 64 receives a resistance force during passage. That is, in addition to the squeeze effect in the related art, the oil 64 passing through the communication holes 51 of the holed member 54 functions as a damper with respect to the vibrations of the bearing unit 8 and the inner member 20. For this reason, damping performance can be greatly improved by a simple configuration.

In addition, the region of the holed member 54 in which the communication holes 51 are formed protrudes inward in the radial direction to form the convex section 65. In addition, a sealing support section 72 is disposed at the circumferential end portion and the axial end portion. For this reason, the first region 41 is sealed. Accordingly, a flow of the oil 64 in the circumferential direction and the axial direction is minimized. For this reason, the flow of the oil 64 in the radial direction can be accelerated. That is, the oil 64 can flow via the communication holes 51. For this reason, the damping effect can be efficiently applied due to the resistance force, and the damping performance can be further improved. Further, the damping effect of the holed member 54 can be adjusted by arbitrarily setting the number or arrangement of the convex sections 65 according to vibration characteristics of the rotary machine 1 on which the holed members 54 are mounted.

Further, at least a part of the axial end of the gap 42 is configured to open. Accordingly, the oil 64 supplied to the first region 41 and moved to the second region 42 via the communication holes 51 can be discharged from the axial end of the second region 42 that is open.

Hereinabove, while the second embodiment of the present disclosure has been described, various changes and modifications may be made to the above-mentioned configuration without departing from the spirit of the present disclosure. For example, the sealing support section 69 is not limited to the above-mentioned configuration. In one example, as shown in FIG. 14B, the sealing support section 69 has a support mechanism 66 and a seal member 68.

The support mechanism 66 is provided on the circumferential end portion and the axial end portion of the convex section 65, and supports the inner member 20 from an outward side in the radial direction. In addition, the support mechanism 66 is deformable in the radial direction according to the vibrations of the inner member 20. In one example, as shown in FIG. 14B, the support mechanism 66 is a notch member formed integrally with the convex section 65. The notch member is configured to adjust rigidity and be deformable in the radial direction by cutting out the member having a predetermined rigidity from both sides in the circumferential direction. In addition, an end portion of the notch member on an inward side in the radial direction has an accommodating concave section 70 configured accommodate the seal member 68 while coming in contact with the inner member 20. The accommodating concave section 70 is a concave section provided in an end portion of the support mechanism 66 on an inward side in the radial direction and recessed inward in the radial direction. The accommodating concave section 70 defines a space configured to accommodate the seal member 68 between the support mechanism 66 and the inner member 20. Here, a portion of the inner member 20 facing the convex section 65 protrudes outward in the radial direction. Further, rigidity of the support mechanism 66 can be arbitrarily adjusted by arbitrarily setting the number, shape, or the like, of the notches.

The seal member 68 is accommodated in the accommodating concave section 70 of the support mechanism 66. A sealing part such as an O-ring or the like is used in the seal member 68. The seal member 68 provided in the accommodating concave section 70 of the support mechanism 66 comes in contact with the inner member 20 and seals the first region 41 in the circumferential direction and the axial direction. Further, when the first region 41 is sealed by joining the end portion of the notch member on the inward side in the radial direction and the outer circumferential surface 22 of the inner member 20 through welding or the like, there is no need to necessarily provide the seal member 68.

In addition, in another example, as shown in FIG. 14C, the support mechanism 66 may be constituted by an elastic member, and a seal part such as an O-ring or the like may be used in the seal member 68. Here, an end portion of the elastic member is attached to the outer circumferential surface 22 and the convex section 65 of the inner member 20. The elastic member is configured to be expandable in the radial direction according to the vibrations of the inner member 20.

Third Embodiment

Figure 15:
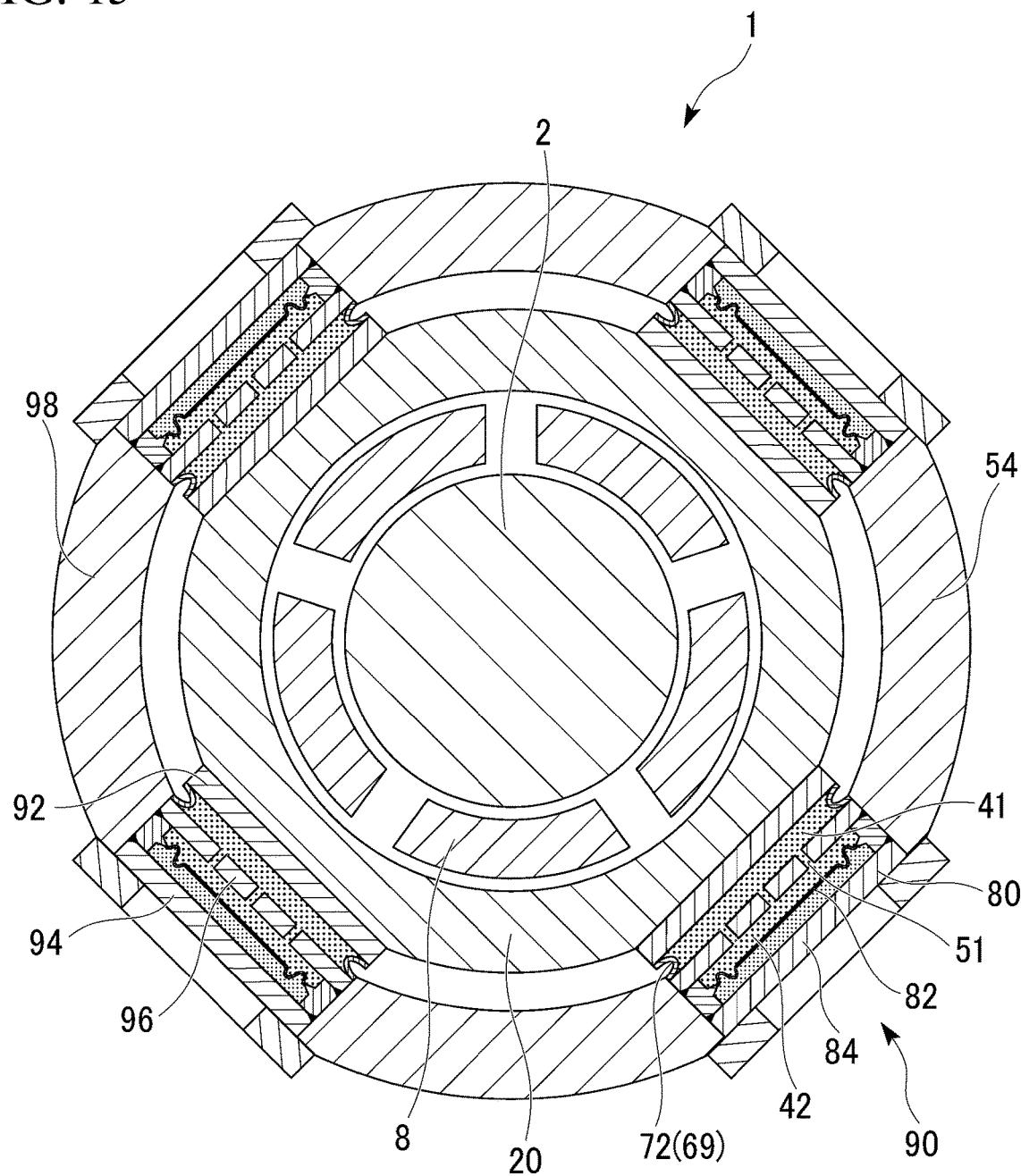
FIG. 15 is an enlarged view of a main part of a squeeze film damper according to a third embodiment.
Figure 16:
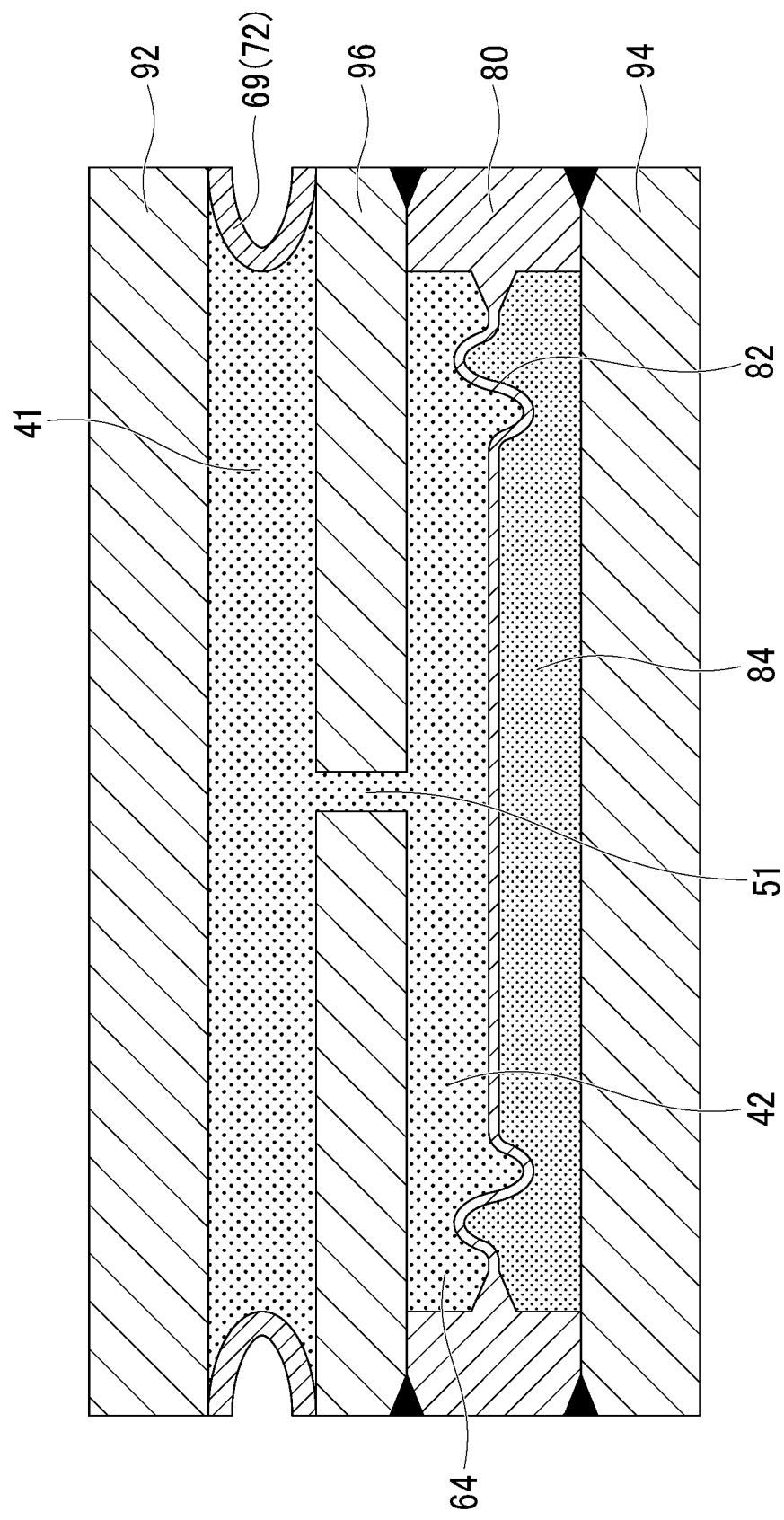
FIG. 16 is a cross-sectional view showing a rotary machine according to another example of the third embodiment in an axial direction.

Hereinafter, a third embodiment of the present disclosure will be described with reference to FIG. 15 and FIG. 16. In the third embodiment, the same components as those of the embodiment are designated by the same reference numerals, and detailed description thereof will be omitted. FIG. 15 is an enlarged view of a major part of a squeeze film damper according to the third embodiment. FIG. 16 is a cross-sectional view showing a rotary machine according to another example of the third embodiment in the axial direction.

As shown in FIG. 15, the third embodiment is distinguished from the second embodiment in that a sealing member 80 is attached to the holed member 54 to seal the second region 42 of the second embodiment. Specifically, as shown in FIG. 15, the sealing member 80 is attached to an outer circumferential surface of the holed member 54 to seal the second region 42 from an outward side in the radial direction. In one example, the sealing member 80 is detachably attached to the convex section 65 using a fastening tool (not shown) such as a bolt or the like. Here, the first region 41 and the second region 42 are sealed. Further, in FIG. 15, while the notch member and the seal member are shown as the sealing support section 69, the other sealing support section 69 described in the second embodiment may be applied thereto.

In addition, when the sealing member 80 is attached thereto, a space is formed on an outward side of the second region 42 in the radial direction. Then, when a gas is enclosed in the space, a gas region 84 is formed in the sealing member 80. Further, a diaphragm 82 of a thin film is provided at a boundary between the gas region 84 and the second region 42. The diaphragm 82 is formed of a material having flexibility that is deformable according to an action of an external force. In one example, the diaphragm 82 is formed of a material such as a rubber, a metal, or the like. Accordingly, the diaphragm 82 is configured to be deformable in the radial direction according to a pressure difference between the gas region 84 and the second region 42.

In the above-mentioned configuration, when the oil 64 is supplied to the first region 41 in the gap between the convex section 65 and the inner member 20 through the oil supply path (not shown), the oil 64 flows into the second region 42 from the first region 41 via the communication holes 51 according to the weight of the oil 64 or the pressure of the oil 64 supplied into the first region 41. As a result, an oil film is formed in the gap 40 including the first region 41 and the second region 42. Further, in one example, the oil supply path 60 described in the first embodiment is applied to the oil supply path.

In this state, for example, when the bearing unit 8 and the inner member 20 supporting the bearing unit 8 are vibrated according to rotation of the rotor shaft 2, an interval between the outer circumferential surface 22 of the inner member 20 and the inner circumferential surface of the convex section 65, i.e., an interval of the first region 41 is varied according to the vibrations. According to the variation in interval, a pressure is generated by a so-called squeeze action due to a viscous resistance of the oil 64 in the first region 41, and a damping effect with respect to the vibrations is obtained.

Further, a configuration in which the holed member 54 including the plurality of communication holes 51 configured to allow the first region 41 on an inward side in the radial direction and the second region 42 on an outward side in the radial direction to communicate with each other is disposed in the gap 40 between the inner member 20 and the outer member 30 is provided. According to the configuration, for example, when the bearing unit 8 and the inner member 20 supporting the bearing unit 8 are vibrated according to rotation of the rotor shaft 2, some of the oil 64 passes through the communication holes 51 of the holed member 54 while following the outer circumferential surface 22 of the inner member 20. The oil 64 receives a resistance force during passage. That is, in addition to the squeeze effect in the related art, the oil 64 passing through the communication holes 51 of the holed member 54 functions as a damper with respect to the vibrations of the bearing unit 8 and the inner member 20. For this reason, damping performance can be greatly improved by a simple configuration.

In addition, a region of the holed member 54 in which the communication holes 51 is provided protrudes inward in the radial direction to form the convex section 65, and the seal member 68 is disposed on the circumferential end portion and the axial end portion. As a result, the first region 41 is sealed. Accordingly, a flow of the oil 64 in the circumferential direction and the axial direction can be minimized, and a flow of the oil 64 in the radial direction can be accelerated. That is, a flow of the oil 64 can be accelerated to flow via the communication holes 51. For this reason, a function of the damper due to the resistance force can be efficiently applied, and damping performance can be further improved. Further, the damping effect of the holed member 54 can be adjusted by arbitrarily setting the number or arrangement of the convex sections 65 according to vibration characteristics of the rotary machine 1 on which the holed member 54 is mounted.

Further, in the case of the embodiment, the second region 42 is sealed by the sealing member 80. For this reason, air contamination during circulation of the oil 64 is minimized. Accordingly, a decrease of the damping performance due to contamination of the oil 64 with air can be minimized.

Further, in the embodiment, the gas region 84 is provided on the sealing member 80, and the diaphragm 82 that is deformable in the radial direction is provided on the boundary between the gas region 84 and the second region 42. Accordingly, even in a state in which the sealing member 80 seals the second region 42, the diaphragm 82 is deformed in the radial direction due to a pressure difference between the gas region 84 and the oil 64. As a result, the oil 64 can passes through the first region 41 and the second region 42 via the communication holes 51. Accordingly, even in a state in which the second region 42 is sealed, damping performance can be greatly improved by receiving the resistance force when the oil 64 flows into the communication holes 51.

In addition, the pressure of the gas region 84 of the sealing member 80 can be adjusted by detachably attaching the sealing member 80 to the convex section 65. For this reason, damping performance can be adjusted.

Hereinabove, while the third embodiment of the present invention has been described, various changes and modifications may be made to the above-mentioned configuration without departing from the spirit of the present disclosure. For example, as shown in FIG. 16, another example of the embodiment may be constituted by a unit 90 from which the holed member 54 can be removed, and an arc section 98 having a space into which the unit 90 can be inserted. At least one space is formed in the arc section 98 in the circumferential direction. For this reason, the arc section 98 is configured such that the unit 90 can be inserted thereinto.

The unit 90 includes a first member 92, a second member 94, a third member 96, the sealing support section 69 and the sealing member 80. The first member 92 is an end portion on an inward side in the radial direction and comes in contact with the inner member 20. The second member 94 is an end portion on an outward side in the radial direction and provided to be separated from the first member 92 with a gap in the radial direction. The second member 94 is attached to the arc section 98. The third member 96 is provided in the gap. The third member 96 has the first region 41 on an inward side in the radial direction, and the plurality of communication holes 51 in communication with the second region 42 on an outward side in the radial direction. The sealing support section 69 supports the first member 92 from an outward side in the radial direction while sealing the first region 41. The sealing member 80 is attached to an inward side of the second member 94 in the radial direction and seals the second region 42.

The first member 92 is a plate-shaped member. The first member 92 comes in contact with the inner member 20 when the unit 90 is inserted thereinto. For example, the first member 92 may be fixed to the inner member 20 using a fastening tool such as a bolt or the like.

While the second member 94 is a plate-shaped member having the same shape as that of the first member 92, the second member 94 having a width that is larger than that of the first member 92 is attached to the arc section 98. Further, a width of the second member 94 may not be necessarily formed to be greater than that of the first member 92, the shape, dimension, or the like, thereof is not limited as long as the unit 90 is attached to the outer member 30. For this reason, the second member 94 may not be necessarily attached to the outer circumferential surface of the outer member 30. In one example, a side surface of the second member 94 may be fixed by being attached to a side surface of the arc section 98.

The third member 96 is disposed in the gap formed between the first member 92 and the second member 94. The third member 96 is a plate-shaped member configured to define the first region 41 on an inward side in the radial direction and the second region 42 on an outward side in the radial direction. In addition, the plurality of communication holes 51 are formed in the third member 96. The same configuration as the shape described in the above-mentioned embodiments is applied to a shape of the plurality of communication holes 51. Further, the first region is previously filled with the oil 64.

The sealing support section 69 is provided on the end portions of the first region 41 in the axial direction and the circumferential direction. The sealing support section 69 seals the first region 41. In addition, the sealing support section 69 supports the first member 92 from an outward side in the radial direction. The configuration described in the embodiment is applied to the sealing support section 69, and an example thereof is the bellows 72.

In addition, the unit 90 is provided on an inward side of the second member 94 in the radial direction. The unit 90 has the sealing member 80 configured to seal the second region 42. A configuration of the sealing member 80 is the same as that of the sealing member 80 of the embodiment. That is, the sealing member 80 has the diaphragm 82 and the gas region 84. Since these configurations are the same as those of the sealing member 80 of the embodiment, detailed description thereof will be omitted.

According to the above-mentioned configuration, in a state in which the unit 90 is inserted into the space formed in the arc section 98, when the inner member 20 is vibrated, the interval of the first region 41 present in the unit 90 is varied. As a result, the unit 90 functions as the damper with respect to the vibrations. Accordingly, the same effect as that described in the embodiment can be exhibited.

In addition, the unit 90 is detachably attached to the holed member 54. For this reason, damping performance can be adjusted by changing a type of oil used in the unit 90, adjusting a degree of degasification of the oil 64, or changing a type of a gas enclosed in the gas region 84. Accordingly, the unit 90 can be configured according to vibration characteristics of the rotary machine 1.

Hereinabove, while the embodiments of the present invention have been described in detail with respect to the accompanying drawings, the specific configuration is not limited to these embodiments, and includes design changes without departing from the spirit of the present invention.

EXPLANATION OF REFERENCES

1 Rotary machine
2 Rotor shaft
3 Rotor blade
4 Gear
5 Impeller
8 Bearing unit (Bearing metal, bearing pad)
9 Pivot
10 Squeeze film damper
20 Inner member
20A Upper housing
20B Lower housing
22 Outer circumferential surface
24 Axial end portion
30 Outer member
32 Support section
40 Gap
41 First region
42 Second region
50, 54 Holed member
51 Communication hole
51A Central axis
52 Cylindrical section
53 Tapered section
60 Oil supply path
62 Internal flow path
62A Axial extension section
62B Radial extension section
64 Oil
65 Convex section
66 Support mechanism
68 Seal member
69 Sealing support section
70 Accommodating concave section
72 Bellows
80 Sealing member
82 Diaphragm
84 Gas region
88 Slit
90 Unit
92 First member
94 Second member
96 Third member
98 Arc section

What is claimed is:

1. A squeeze film damper comprising:
an inner member configured to support a bearing unit;
an outer member provided circumferentially outward from the inner member so as to face the inner member with a gap extending in a circumferential direction interposed therebetween;
a holed member provided in the gap and having a plurality of communication holes configured to allow a first region of the gap on an inward side in a radial direction and a second region of the gap on an outward side in the radial direction to communicate with each other; and
an oil supply path comprising an internal flow path inside the inner member, the internal flow path being configured to introduce oil to the first region from an axial end portion of the inner member.

2. The squeeze film damper according to claim 1, wherein the internal flow path comprises an axial extension section extending from the axial end portion of the inner member in an axial direction, and a radial extension section which is continuous with the axial extension section and extends in the radial direction.

3. The squeeze film damper according to claim 2, wherein the radial extension section is the only radial extension section continuous with the axial extension section.

4. The squeeze film damper according to claim 2, wherein the radial extension section is one of a plurality of radial extension sections continuous with the axial extension section.

5. The squeeze film damper according to claim 1, wherein the holed member is supported by the outer member at a plurality of intervals in the circumferential direction.

6. The squeeze film damper according to claim 1, wherein a dimension D between the inner member and the holed member and a diameter d of at least one of the plurality of communication holes satisfy $0.1d<D<10d$.

7. The squeeze film damper according to claim 1, wherein at least one of the plurality of communication holes has a tubular shape extending in the radial direction.

8. The squeeze film damper according to claim 1, wherein one of the plurality of communication holes, which is closest to an axial end portion of the holed member, is inclined from the radial direction such that a central axis thereof is closer to the axial end portion of the holed member on an outward side than on an inward side in the radial direction.

9. The squeeze film damper according to claim 1, wherein at least one of the plurality of communication holes has a smaller diameter on an outward side than on an inward side in the radial direction.

10. The squeeze film damper according to claim 1, wherein at least one of the plurality of communication holes has a larger diameter on an outward side than on an inward side in the radial direction.

11. The squeeze film damper according to claim 1, wherein at least one of the plurality of communication holes comprises a cylindrical section on an outward side in the radial direction, and a tapered section continuous with an inner end of the cylindrical section in the radial direction and expanding toward an inward side in the radial direction.

12. The squeeze film damper according to claim 1, wherein at least one of the plurality of communication holes has a slit shape.

13. The squeeze film damper according to claim 1, wherein the gap is open in at least a part of an axial end thereof.

14. A rotary machine comprising:
a squeeze film damper according to claim 1;
a rotor shaft; and
a bearing unit configured to rotatably support the rotor shaft.

15. A squeeze film damper comprising:
an inner member configured to support a bearing unit; and
a holed member provided circumferentially outward from the inner member at an interval,
wherein the holed member comprises:
at least one detachable unit; and
an arc section having a space into which the at least one detachable unit is insertable,
wherein the at least one detachable unit comprises:
a first member that is an end portion on an inward side in a radial direction and in contact with the inner member;
a second member that is an end portion on an outward side in the radial direction, provided such that there is a gap between the second member and the first member and the second member is attached to the arc section;

a third member provided in the gap and having a plurality of communication holes configured to allow a first region in the gap on an inward side in the radial direction and a second region in the gap on an outward side in the radial direction to communicate with each other;

a sealing support section configured to support the first member from an outward side in the radial direction while sealing the first region; and a sealing member attached to the second member on an inward side in the radial direction and configured to seal the second region, wherein:

the sealing member comprises a film diaphragm on a boundary with the second region;

a gas is enclosed in a space defined by the sealing member and the second member; and the film diaphragm is deformable in the radial direction by a pressure difference between the gas and the oil in the second region.

* * * * *